United States Patent
Johnston et al.

(10) Patent No.: US 10,015,014 B2
(45) Date of Patent: Jul. 3, 2018

(54) TECHNOLOGIES FOR SECURE PRESENCE ASSURANCE

(71) Applicant: Intel Corporation, Santa Clara, CA (US)

(72) Inventors: David Johnston, Beaverton, OR (US); David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/583,701

(22) Filed: Dec. 27, 2014

(65) Prior Publication Data

US 2016/0191248 A1    Jun. 30, 2016

(51) Int. Cl.
*H04L 29/06* (2006.01)
*H04L 9/32* (2006.01)
*G09C 1/00* (2006.01)

(52) U.S. Cl.
CPC .............. *H04L 9/3242* (2013.01); *G09C 1/00* (2013.01); *H04L 9/3271* (2013.01)

(58) Field of Classification Search
CPC ............................ H04L 9/0816; H04L 9/3242
USPC ......................................................... 380/44
See application file for complete search history.

(56) References Cited

U.S. PATENT DOCUMENTS

| | | | | |
|---|---|---|---|---|
| 8,156,269 | B2* | 4/2012 | Guido | F02D 37/02 341/110 |
| 2006/0015719 | A1* | 1/2006 | Herbert | G06F 21/305 713/164 |
| 2012/0173812 | A1* | 7/2012 | Kidney | G06F 11/1076 711/114 |
| 2012/0246470 | A1* | 9/2012 | Nicolson | G06F 21/57 713/158 |
| 2013/0274006 | A1* | 10/2013 | Hudlow | G07F 17/3223 463/29 |

OTHER PUBLICATIONS

"Built-in self-test", downloaded from http://en.wikipedia.org/wiki/Built-in_self-test, retrieved Oct. 2, 2014.
"Cryptographically secure pseudorandom number generator", downloaded from http://en.wikipedia.org/wiki/Cryptographically_secure_pseudorandom_number_generaator, retrieved Oct. 2, 2014.
Becker et al., "Stealthy Dopant-Level Hardware Trojans", CHES'13 Proceedings of the 15th international conference on Cryptographic Hardware and Embedded Systems, pp. 197-214.

\* cited by examiner

*Primary Examiner* — Dao Q Ho
(74) *Attorney, Agent, or Firm* — Barnes & Thornburg LLP (57) ABSTRACT

Technologies for secure presence assurance include a computing device having a presence assertion circuitry that receives an input seed value and generates a cryptographic hash based on the received input seed value. The computing device further verifies the integrity of the presence assertion circuitry based on the generated cryptographic hash.

21 Claims, 4 Drawing Sheets

TECHNOLOGIES FOR SECURE PRESENCE ASSURANCE

BACKGROUND

Various mechanisms exist that allow the integrity of a particular computing device and/or particular components of the computing device to be confirmed. For example, computing devices often implement a power-on self-test (POST) procedure in order to test the memory, buses, and/or other components on power-up. Similarly, a built-in self-test (BIST) mechanism may be utilized to verify the internal functionality of an integrated circuit. Generally, BIST mechanisms output one or more cyclic redundancy check (CRC) values that may be compared to reference values associated with a properly functioning integrated circuit.

BIST mechanisms are often used to check for errors made during manufacturing. For example, if a transistor of an integrated circuit is "popped" or a wire/trace is not properly connected during manufacturing, the CRC value outputted by the BIST mechanism will vary from that of the integrated circuit when properly constructed and properly functioning. As such, BIST mechanisms are generally intended to address statistically randomly distributed errors associated with manufacturing and do little to attest to the security of the integrated circuit. For example, it is conceivable that an attacker could remove some circuitry from the integrated circuit and achieve the same BIST CRC values as with the properly functioning circuit (e.g., due to collision associated with CRC functions).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
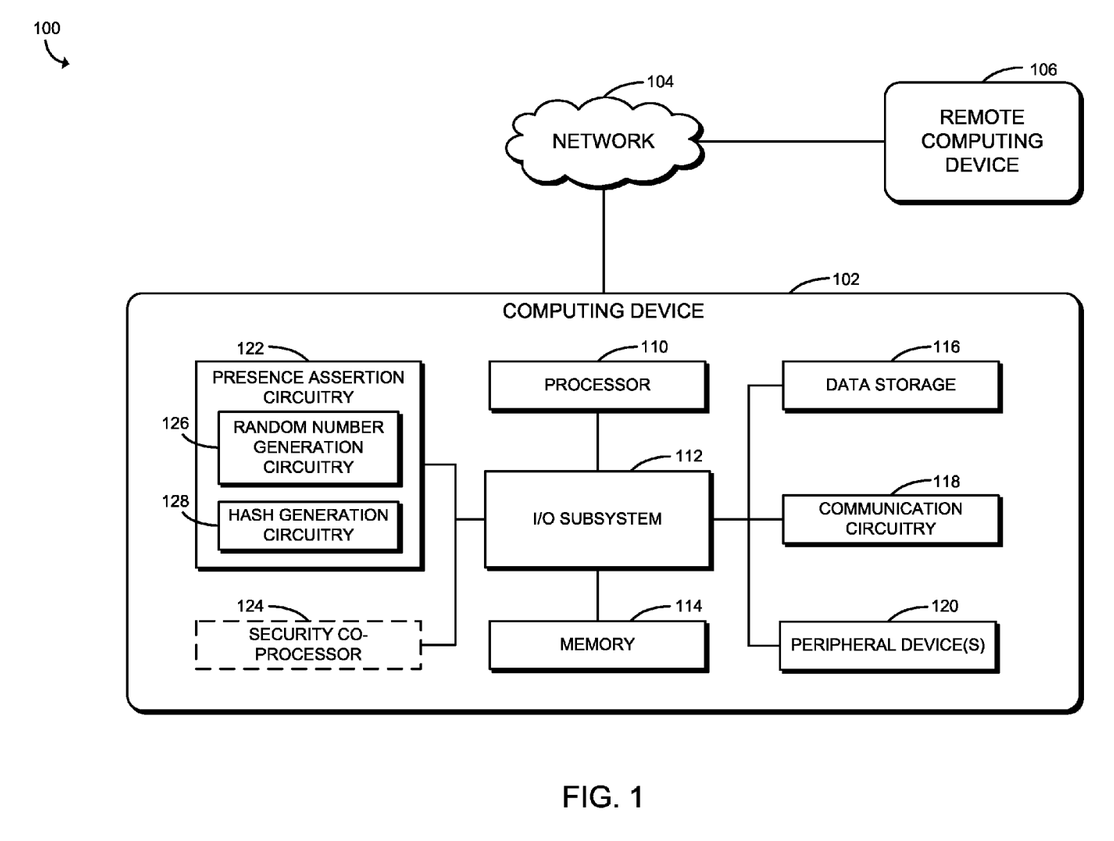
FIG. 1 is a simplified block diagram of at least one embodiment of a system for secure presence assurance.

Referring now to FIG. 1, a system 100 for secure presence assurance includes a computing device 102, a network 104, and a remote computing device 106. Although only one computing device 102, one network 104, and one remote computing device 106 are illustratively shown in FIG. 1, the system 100 may include any number of computing devices 102, networks 104, and remote computing devices 106 in other embodiments. Further, in some embodiments, the network 104 and/or the remote computing device 106 may be omitted from the system 100. For example, in such embodiments, the computing device 102 may perform the functions described herein without any interaction with the remote computing device 106.

As described in detail below, in the illustrative embodiment, the computing device 102 includes presence assertion circuitry 122 that is configured to generate a cryptographic hash based on an input seed value received, for example, from a user of the computing device 102, a remote computing device 106, or data storage of the computing device 102. In particular, the presence assertion circuitry 122 may include cryptographically secure pseudorandom number generators (CSPRNGs) that generate cryptographically secure pseudorandom numbers based on the input seed value and hash generators that generate cryptographic hashes based on the cryptographically secure pseudorandom numbers and/or the input seed value, which may be utilized in generating a final cryptographic hash. Further, the computing device 102 verifies the integrity of the presence assertion circuitry 122 based on the generated cryptographic hash. For example, the computing device 102 may simulate execution of the presence assertion circuitry 122 based on a model of the presence assertion circuitry 122 and the same input seed value to generate a simulated hash value and compare that value to the generated hash value of the presence assertion circuitry 122. It should be appreciated that the values should match if the presence assertion circuitry 122 is functioning properly (e.g., properly connected, unmodified, etc.).

The computing device 102 may be embodied as any type of computing device capable of performing the functions described herein. For example, the computing device 102 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, gateway, and/or any other computing/communication device. As shown in FIG. 1, the illustrative computing device 102 includes a processor 110, an input/output ("I/O") subsystem 112, a memory 114, a data storage 116, a communication circuitry 118, one or more peripheral devices 120, and a presence assertion circuitry 122 and, in some embodiments, may also include a security co-processor 124. Additionally, the illustrative presence assertion circuitry 122 includes a random number generation circuitry 126 and a hash generation circuitry 128. Of course, the computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing device 102 useful for performing the functions described herein.

The communication circuitry 118 may be embodied as any communication circuit, device, or collection thereof, capable of enabling communications between the computing device 102 and other remote devices over the network 104 (e.g., the remote computing device 106). The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the computing device 102.

The presence assertion circuitry 122 may be embodied as any hardware component(s) or circuitry capable of assuring that it is present on the computing device 102 and/or otherwise performing the functions described herein. In other words, in the illustrative embodiment, the presence assertion circuitry 122 makes an assertion that it is present on the computing device 102, which may be verified by the computing device 102 and/or the remote computing device 106 (e.g., to confirm that the presence assertion circuitry 122 is functioning properly and/or is unmodified). As described herein, the presence assertion circuitry 122 generates a cryptographic hash based on an input seed value (e.g., a random bit sequence) supplied to the presence assertion circuitry 122, which may be compared to a reference hash associated with a properly functioning version of the presence assertion circuitry 122 as described herein. As such, in the illustrative embodiment, each time a particular input seed value is provided to the presence assertion circuitry 122, the cryptographic hash generated by the presence assertion circuitry 122 is the same (provided that the presence assertion circuitry 122 is properly functioning and has not been tampered with), thereby providing a cryptographically secure assurance of the presence of the presence assertion circuitry 122 in the computing device 102. It should be appreciated that, in some embodiments, all or a portion of the presence assertion circuitry 122 may be configured to perform functions associated with the operation of the computing device 102 unrelated to secure presence assurance.

In the illustrative embodiment, the presence assertion circuitry 122 includes a random number generation circuitry 126 and hash generation circuitry 128. The random number generation circuitry 126 is configured to generate one or more suitable random numbers based on the input seed value. It should be appreciated that the particular characteristics of the generated random numbers may vary depending on the particular embodiment. For example, in the illustrative embodiment, the random number generation circuitry 126 is configured to generate cryptographically secure pseudorandom numbers. It should be appreciated that such pseudorandom numbers have a high "quality" of randomness suitable for cryptography. The hash generation circuitry 128 is configured to generate one or more hash values based on input data. For example, in the illustrative embodiment, the hash generation circuitry 128 perform a cryptographic hash of input data provided to a "final" cryptographic hash function based on execution of the presence assertion circuitry 122 and the input seed value. In other embodiments, the hash generation circuitry 128 may generate multiple "final" cryptographic hash values to be verified. It should be appreciated that the hash generation circuitry 128 may generate cryptographic hashes using any suitable algorithm, technique, and/or mechanism. For example, in some embodiments, the hash generation circuitry 128 may utilize a message digest function (e.g., MD4, MD5, etc.), a secure hash algorithm (e.g., SHA-1, SHA-2, etc.), and/or any other suitable cryptographic hash algorithm. It should further be appreciated that, in some embodiments, the presence assertion circuitry 122 may include multiple intermediate hash functions (e.g., located at each of the stages), for example, to introduce further entropy.

It should be appreciated that BIST circuitry may include linear feedback shift registers (LFSRs) to provide stimulus and CRC generators to provide hash values. In some embodiments, the presence assertion circuitry 122 may be embodied similar to BIST circuitry with such linear feedback shift registers of the BIST circuitry replaced with cryptographically secure pseudorandom number generators and such CRC generators replaced with cryptographic hash generators. It should be appreciated that it is cryptographically hard to modify such a circuit in a way that leads to a collision in the outputted cryptographic hash (i.e., the hash result), which generally allows for hardware Trojan detection.

Although described as a single circuitry, it should be appreciated that each of the random number generation circuitry 126 and the hash generation circuitry 128 may be embodied as contiguous (e.g., directly electrically connected) circuitry or as a combination of multiple, separate circuitries depending on the particular embodiment. For example, in some embodiments, the presence assertion circuitry 122 may be arranged in stages (e.g., stages separated by other circuitry of the computing device 102) such that the presence assertion circuitry 122 includes random number generation circuitry 126 and hash generation circuitry 128 in one or more (e.g., each) of the stages.

The security co-processor 124 may be embodied as any hardware component(s) or circuitry capable of establishing a trusted execution environment and/or otherwise performing the functions described herein. For example, in some embodiments, the security co-processor 124 may be embodied as a Converged Security and Manageability Engine (CSME), a security engine, a trusted platform module (TPM), or an out-of-band processor. It should be appreciated that the security co-processor 124 may be tamper resistant and include secure storage and processing capabilities such that malware attacks on the host operating system of the computing device 102 do not affect the trusted execution environment of the security co-processor 124. Further, in some embodiments, the security co-processor 124 may establish an out-of-band communication channel with the remote computing device 106 and/or other remote devices. Depending on the particular embodiment, the security co-processor 124 may perform various security-related functions (e.g., attestation, encryption/decryption, cryptographic signature generation/verification, certificate generation/verification, and/or other security functions).

The network 104 may be embodied as any type of communication network capable of facilitating communication between the computing device 102 and remote devices (e.g., the remote computing device 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The remote computing device 106 may be embodied as any computing device capable of performing the functions described herein. For example, the remote computing device 106 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, gateway, and/or any other computing/communication device. In some embodiments, the remote computing device 106 may include components similar to the components of the computing device 102 described above and/or components commonly found in a computing device such as a processor, memory, I/O subsystem, data storage, peripheral devices, and so forth, which are not illustrated in FIG. 1 for clarity of the description. Of course, in some embodiments, one or more components of the computing device 102 may be omitted from the remote computing device 106 (e.g., the presence assertion circuitry 122).

Figure 2:
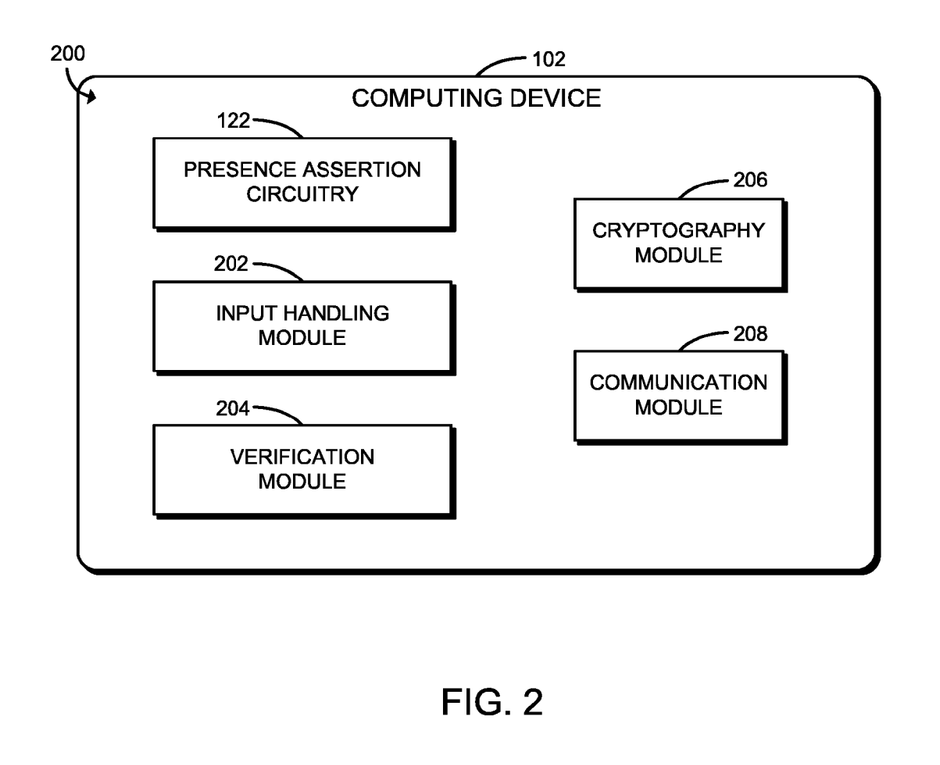
FIG. 2 is a simplified block diagram of at least one embodiment of an environment of the computing device of the system of FIG. 1.

Referring now to FIG. 2, in use, the computing device 102 establishes an environment 200 for secure presence assertion. The illustrative environment 200 of the computing device 102 includes the presence assertion circuitry 122, an input handling module 202, a verification module 204, a cryptography module 206, and a communication module 208. The various modules of the environment 200 may be embodied as hardware, software, firmware, or a combination thereof. For example, the various modules, logic, and other components of the environment 200 may form a portion of, or otherwise be established by, the processor 110 or other hardware components of the computing device 102. As such, in some embodiments, one or more of the modules of the environment 200 may be embodied as a circuit or collection of electrical devices (e.g., an input handling circuit, a verification circuit, a cryptography circuit, and/or a communication circuit). Additionally, in some embodiments, one or more of the illustrative modules may form a portion of another module and/or one or more of the illustrative modules may be embodied as a standalone or independent module.

The input handling module 202 is configured to receive an input seed value for the presence assertion circuitry 122 and pass that value to the circuitry 122. As described herein, the input handling module 202 may receive the input seed value from a variety of sources depending on the particular embodiment. For example, in some embodiments, a user of the computing device 102 may provide a particular input seed value (e.g., for user-initiated presence assurance). In other embodiments, the remote computing device 106 (e.g., a remote management device) may provide an input seed value to the computing device 102 for secure presence assertion. In such embodiments, the input seed value may be encrypted and/or cryptographically signed in which case the cryptography module 206 may decrypt/verify the input seed value prior to transmission to the presence assertion circuitry 122 and/or the input handling module 202. In yet other embodiments, the input handling module 202 may retrieve the input seed value from the memory 114, the data storage 116, and/or a register of the computing device 102. For example, in some embodiments, the input seed value may be embodied as a linear feedback shift register value or other suitable value stored on the computing device 102. Of course, the characteristics of the input seed value may vary depending on the particular embodiment. For example, the input seed value may be embodied as a random bit sequence, a random or pseudorandom number, a cryptographically secure pseudorandom number, or another suitable value. In some embodiments, the input handling module 202 may modify the input seed value such that it is interpretable by the presence assertion circuitry 122.

The verification module 204 is configured to verify the integrity of the presence assertion circuitry 122 based on one or more cryptographic hashes generated by the circuitry 122. It should be appreciated that a model (e.g., a Verilog® or Very High Speed Integrated Circuit Hardware Description Language (VHDL) model) of the presence assertion circuitry 122 may be published such that users of the computing device 102 and/or the remote computing device 106 may access and simulate the presence assertion circuitry 122 based on various parameters (e.g., the input seed values). Further, in the illustrative embodiment, the cryptographic hash value outputted by the simulated model for a given input seed value represents the hash value that should be outputted by the presence assertion circuitry 122 based on the same input seed value if the presence assertion circuitry 122 is entirely present and/or otherwise functioning properly. As such, in some embodiments, the computing device 102 simulates the presence assertion circuitry 122 based on the model and a particular input seed value and compares the simulated hash value to the hash value generated by the presence assertion circuitry 122 to determine whether there is a match. In other embodiments, the computing device 102 may store (e.g., in the memory 114 and/or the data storage 116) a table of input seed values and corresponding cryptographic hash values such that the verification module 204 may use the table to verify the presence of the circuitry 122. In yet other embodiments, the computing device 102 may transmit the generated cryptographic hash to the remote computing device 106 (e.g., via the communication module 208) for remote verification.

The cryptography module 206 performs various cryptographic functions for the computing device 102. Depending on the particular embodiment, the cryptography module 206 may be embodied as a cryptographic engine, an independent security co-processor of the computing device 102 (e.g., the security co-processor 124), a cryptographic accelerator incorporated into the processor 110, or a stand-alone cryptographic software/firmware. In some embodiments, the cryptography module 206 may generate various cryptographic keys (e.g., symmetric/asymmetric cryptographic keys) for encryption, decryption, signing, and/or signature verification. Similarly, the cryptography module 206 may receive cryptographic keys from the remote computing device 106 and/or other remote devices for various cryptographic purposes. In some embodiments, the cryptography module 206 may establish a secure connection with remote devices (e.g., the remote computing device 106) over the network 104. For example, the cryptography module 206 may perform a key exchange (e.g., a Diffie-Hellman key exchange) with the remote computing device 106 or a component thereof (e.g., a corresponding security co-processor) to exchange cryptographic keys. As described below, in some embodiments, the cryptography module 206 encrypts and/or cryptographically signs the cryptographic hashes generated by the presence assertion circuitry 122 prior to transmittal to the remote computing device 106.

The communication module 208 handles the communication between the computing device 102 and remote devices (e.g., remote computing device 106) through the network 104. For example, as described herein, the communication module 208 may transmit a cryptographic hash (e.g., encrypted/signed) to the remote computing device 106 for remote verification (e.g., in response to a request from the remote computing device 106).

Figure 3:
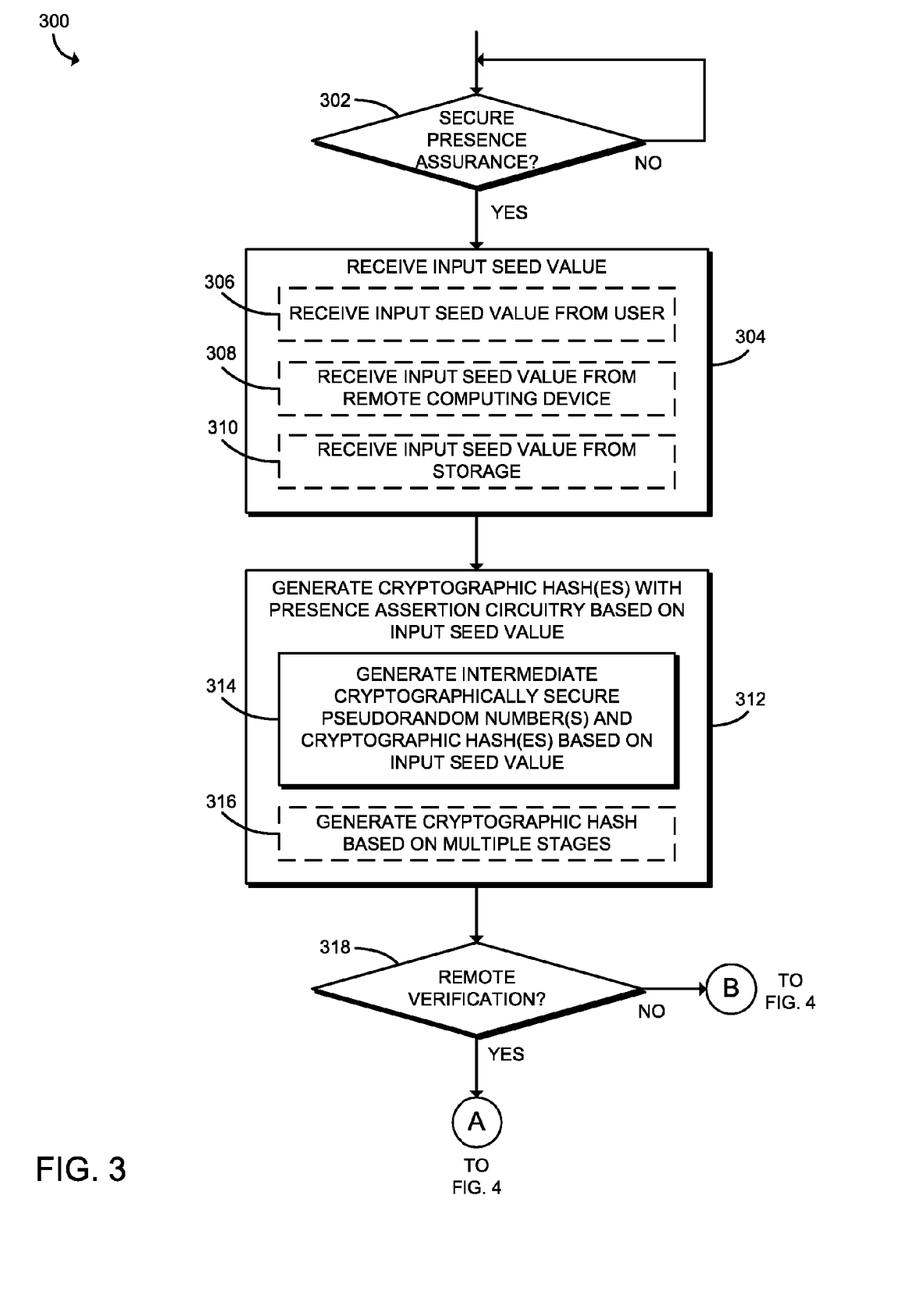
FIGS. 3-4 is a simplified flow diagram of at least one embodiment of a method for secure presence assurance by the computing device of the system of FIG. 1.
Figure 4:
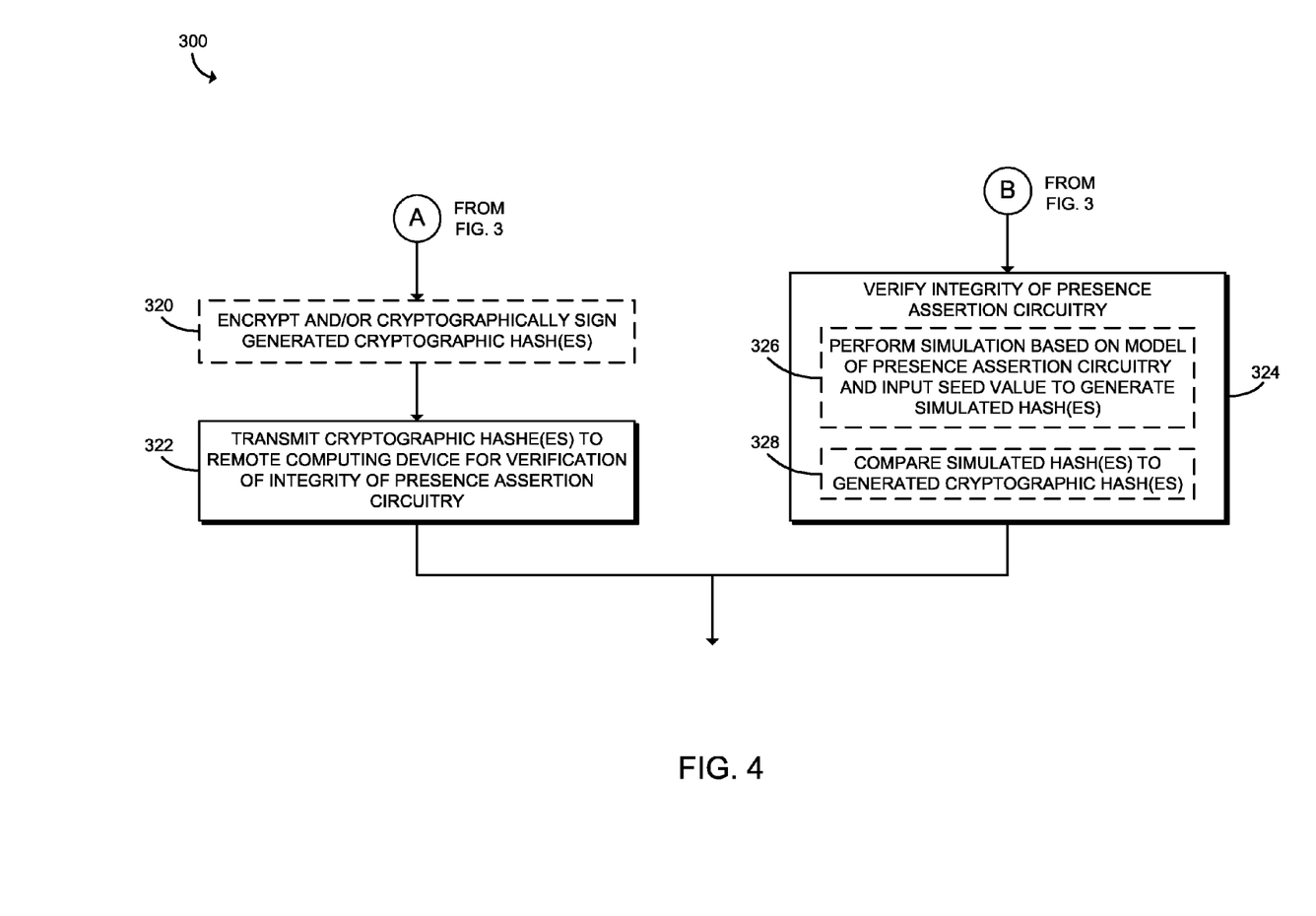

Referring now to FIGS. 3-4, in use, the computing device 102 may execute a method 300 for secure presence assurance. The illustrative method 300 begins with block 302 in which the computing device 102 determines whether to perform secure presence assurance. In other words, the computing device 102 determines whether to perform the functions described herein. It should be appreciated that the computing device 102 may make such a determination in response to receiving a request from a user or the remote computing device 106, in response to boot of the computing device 102, and/or in response to other suitable conditions.

If the computing device 102 determines to perform secure presence assurance, the computing device 102 receives an input seed value in block 304. In particular, in block 306, the computing device 102 may receive an input seed value from a user of the computing device 102. For example, as described above, in some embodiments, a user may supply a particular input seed value (e.g., a random value) to the presence assertion circuitry 122 and the same seed value to a simulated model of the presence assertion circuitry 122 for comparison to determine whether the presence assertion circuitry 122 is fully present in the computing device 102. In other embodiments, in block 308, the computing device 102 may receive the input seed value from the remote computing device 106. For example, a remote management server may be interested in confirming that the presence assertion circuitry 122 has gone unmodified. In yet other embodiments, in block 310, the computing device 102 may receive the input seed value from storage of the computing device 102 (e.g., the memory 114, the data storage 116, or registers of the processor 110 or other components of the computing device 102). For example, in some embodiments, the computing device 102 may retrieve the input seed value upon boot of the computing device 102

In block 312, the computing device 102 generates one or more cryptographic hashes with the presence assertion circuitry 122 based on the input seed value received by the presence assertion circuitry 122. In doing so, in block 314, the computing device 102 generates one or more intermediate cryptographically secure pseudorandom numbers and one or more intermediate cryptographic hashes based on the input seed value. For example, in block 316, the computing device 102 may generate a "final" cryptographic hash based on multiple stages in some embodiments. In some embodiments, the computing device 102 may generate cryptographically secure pseudorandom numbers based on the input seed value and generate intermediate hashes (e.g., cryptographic hashes) as a function of the cryptographically secure pseudorandom numbers. For example, the computing device 102 may generate an intermediate hash for each "stage" of the presence assertion circuitry 122. In some embodiments, a "final" cryptographic hash for the presence assertion circuitry 122 may be generated as a function of the intermediate hashes (e.g., the intermediate hashes may be "combined" in a suitable way), whereas in other embodiments, each of the intermediate hashes may be embodied as cryptographic hashes that are compared to reference hashes to confirm the integrity of the presence assertion circuitry 122 as described herein. In other words, depending on the particular embodiment, the presence assertion circuitry 122 may generate one or more cryptographic hashes for comparison to reference hashes (e.g., generated by a simulated model).

In block 318, the computing device 102 determines whether to perform remote verification of the cryptographic hashes generated by the presence assertion circuitry 122. That is, the computing device 102 determines whether to verify the cryptographic hashes locally or remotely. If the computing device 102 determines to perform remote verification, in block 320 of FIG. 4, the computing device 102 may encrypt and/or cryptographically sign the generated cryptographic hashes. In doing so, it should be appreciated that the computing device 102 may use any suitable cryptographic encryption and/or signature algorithm. In block 322, the computing device 102 transmits the cryptographic hash or the corresponding encrypted/signed message to the remote computing device 106 for remote verification of the integrity of the presence assertion circuitry 122 as described herein.

If the computing device 102 determine to perform local verification in block 318 of FIG. 3, the method 300 advances to block 324 of FIG. 4 in which the computing device 102 verifies the integrity of the presence assertion circuitry 122 locally (i.e., with the computing device 102 itself). In doing so, in block 326, the computing device 102 may perform a simulation of the presence assertion circuitry 122 based on a model of a properly functioning version of the circuitry 122 and the input seed value. In particular, the computing device 102 provides the same input seed value supplied to the presence assertion circuitry 122 to the simulation to generate the corresponding simulated hashes. As described above, the computing device 102 may publish and/or store the model for access and execution by the computing device 102 and/or remote computing devices (e.g., the remote computing device 106). It should be appreciated that the simulation should represent the functionality of the presence assertion circuitry 122 such that the model and the presence assertion circuitry 122 (when functioning properly and unmodified) should output the same cryptographic hash when provided the same input seed value. As such, in block 328, the computing device 102 may compare the simulated hashes to the cryptographic hashes generated by the presence assertion circuitry 122. If those hashes match, the computing device 102 may conclude that the integrity of the presence assertion circuitry 122 has been maintained. In the illustrative embodiment, it should be appreciated that the BIST-like properties of the presence assertion circuitry 122 ensure that there are no undetectable manufacturing defects in the presence assertion circuitry 122 (e.g., no disconnected wires or "popped" transistors) and the cryptographic properties of the presence assertion circuitry 122 ensure that no portion of the presence assertion circuitry 122 can be removed or modified without detection (e.g., due to a low collision rate of cryptographic hash algorithms).

EXAMPLES

Illustrative examples of the technologies disclosed herein are provided below. An embodiment of the technologies may include any one or more, and any combination of, the examples described below.

Example 1 includes a computing device for secure presence assurance, the computing device comprising a presence assertion circuitry to receive an input seed value and generate a cryptographic hash based on the input seed value; and a verification module to verify integrity of the presence assertion circuitry based on the generated cryptographic hash.

Example 2 includes the subject matter of Example 1, and wherein to generate the cryptographic hash comprises to generate an intermediate cryptographically secure pseudorandom number based on the input seed value; and generate an intermediate cryptographic hash based on the input seed value.

Example 3 includes the subject matter of any of Examples 1 and 2, and wherein to generate the intermediate cryptographic hash comprises to generate an intermediate cryptographic hash as a function of the intermediate cryptographically secure pseudorandom number.

Example 4 includes the subject matter of any of Examples 1-3, and wherein to generate the cryptographic hash comprises to generate a plurality of intermediate cryptographically secure pseudorandom numbers based on the input seed value; generate a plurality of intermediate cryptographic hashes as a function of the plurality of intermediate cryptographically secure pseudorandom numbers; and generate the cryptographic hash as a function of the intermediate cryptographic hashes.

Example 5 includes the subject matter of any of Examples 1-4, and wherein to verify the integrity of the presence assertion circuitry comprises to perform a simulation of the presence assertion circuitry based on a model of the presence assertion circuitry and the input seed value to generate a simulated hash; and compare the simulated hash to the generated cryptographic hash.

Example 6 includes the subject matter of any of Examples 1-5, and wherein to verify the integrity of the presence assertion circuitry comprises to transmit the generated cryptographic hash to a remote computing device for verification of the integrity of the presence assertion circuitry.

Example 7 includes the subject matter of any of Examples 1-6, and further comprising a cryptography module to encrypt the generated cryptographic hash with a cryptographic key to generate an encrypted cryptographic hash; and a communication module to transmit the encrypted cryptographic hash to the remote computing device.

Example 8 includes the subject matter of any of Examples 1-7, and further comprising a cryptography module to cryptographically sign a message including the generated cryptographic hash; and a communication module to transmit the cryptographically signed message to the remote computing device.

Example 9 includes the subject matter of any of Examples 1-8, and further comprising an input handling module to receive the input seed value from user input of a user of the computing device.

Example 10 includes the subject matter of any of Examples 1-9, and further comprising a communication module to receive the input seed value from a remote computing device.

Example 11 includes the subject matter of any of Examples 1-10, and wherein to receive the input seed value comprises to receive an input seed value from a data storage of the computing device.

Example 12 includes a method for secure presence assurance by a computing device, the method comprising receiving, by a presence assertion circuitry of the computing device, an input seed value; generating, by the presence assertion circuitry, a cryptographic hash based on the input seed value; and verifying, by the computing device, integrity of the presence assertion circuitry based on the generated cryptographic hash.

Example 13 includes the subject matter of Example 12, and wherein generating the cryptographic hash comprises generating an intermediate cryptographically secure pseudorandom number based on the input seed value; and generating an intermediate cryptographic hash based on the input seed value.

Example 14 includes the subject matter of any of Examples 12 and 13, and wherein generating the intermediate cryptographic hash comprises generating an intermediate cryptographic hash as a function of the intermediate cryptographically secure pseudorandom number.

Example 15 includes the subject matter of any of Examples 12-14, and wherein generating the cryptographic hash comprises generating a plurality of intermediate cryptographically secure pseudorandom numbers based on the input seed value; generating a plurality of intermediate cryptographic hashes as a function of the plurality of intermediate cryptographically secure pseudorandom numbers; and generating the cryptographic hash as a function of the intermediate cryptographic hashes.

Example 16 includes the subject matter of any of Examples 12-15, and wherein verifying the integrity of the presence assertion circuitry comprises performing a simulation of the presence assertion circuitry based on a model of the presence assertion circuitry and the input seed value to generate a simulated hash; and comparing the simulated hash to the generated cryptographic hash.

Example 17 includes the subject matter of any of Examples 12-16, and wherein verifying the integrity of the presence assertion circuitry comprises transmitting the generated cryptographic hash to a remote computing device for verification of the integrity of the presence assertion circuitry.

Example 18 includes the subject matter of any of Examples 12-17, and wherein transmitting the generated cryptographic hash comprises encrypting the generated cryptographic hash with a cryptographic key to generate an encrypted cryptographic hash; and transmitting the encrypted cryptographic hash to the remote computing device.

Example 19 includes the subject matter of any of Examples 12-18, and wherein transmitting the generated cryptographic hash comprises cryptographically signing a message including the generated cryptographic hash; and transmitting the cryptographically signed message to the remote computing device.

Example 20 includes the subject matter of any of Examples 12-19, and wherein receiving the input seed value comprises receiving an input seed value provided by a user of the computing device.

Example 21 includes the subject matter of any of Examples 12-20, and wherein receiving the input seed value comprises receiving an input seed value provided by a remote computing device.

Example 22 includes the subject matter of any of Examples 12-21, and wherein receiving the input seed value comprises receiving an input seed value from a data storage of the computing device.

Example 23 includes a computing device comprising a processor; and a memory having stored therein a plurality of instructions that when executed by the processor cause the computing device to perform the method of any of Examples 12-22.

Example 24 includes one or more machine-readable storage media comprising a plurality of instructions stored thereon that, in response to execution by a computing device, cause the computing device to perform the method of any of Examples 12-22.

Example 25 includes a computing device for secure presence assurance, the computing device comprising means for receiving, by a presence assertion circuitry of the computing device, an input seed value; means for generating, by the presence assertion circuitry, a cryptographic hash based on the input seed value; and means for verifying integrity of the presence assertion circuitry based on the generated cryptographic hash.

Example 26 includes the subject matter of Example 25, and wherein the means for generating the cryptographic hash comprises means for generating an intermediate cryptographically secure pseudorandom number based on the input seed value; and means for generating an intermediate cryptographic hash based on the input seed value.

Example 27 includes the subject matter of any of Examples 25 and 26, and wherein the means for generating the intermediate cryptographic hash comprises means for generating an intermediate cryptographic hash as a function of the intermediate cryptographically secure pseudorandom number.

Example 28 includes the subject matter of any of Examples 25-27, and wherein the means for generating the cryptographic hash comprises means for generating a plurality of intermediate cryptographically secure pseudorandom numbers based on the input seed value; means for generating a plurality of intermediate cryptographic hashes as a function of the plurality of intermediate cryptographically secure pseudorandom numbers; and means for generating the cryptographic hash as a function of the intermediate cryptographic hashes.

Example 29 includes the subject matter of any of Examples 25-28, and wherein the means for verifying the integrity of the presence assertion circuitry comprises means for performing a simulation of the presence assertion circuitry based on a model of the presence assertion circuitry and the input seed value to generate a simulated hash; and means for comparing the simulated hash to the generated cryptographic hash.

Example 30 includes the subject matter of any of Examples 25-29, and wherein the means for verifying the integrity of the presence assertion circuitry comprises means for transmitting the generated cryptographic hash to a remote computing device for verification of the integrity of the presence assertion circuitry.

Example 31 includes the subject matter of any of Examples 25-30, and wherein the means for transmitting the generated cryptographic hash comprises means for encrypting the generated cryptographic hash with a cryptographic key to generate an encrypted cryptographic hash; and means for transmitting the encrypted cryptographic hash to the remote computing device.

Example 32 includes the subject matter of any of Examples 25-31, and wherein the means for transmitting the generated cryptographic hash comprises means for cryptographically signing a message including the generated cryptographic hash; and means for transmitting the cryptographically signed message to the remote computing device.

Example 33 includes the subject matter of any of Examples 25-32, and wherein the means for receiving the input seed value comprises means for receiving an input seed value provided by a user of the computing device.

Example 34 includes the subject matter of any of Examples 25-33, and wherein the means for receiving the input seed value comprises means for receiving an input seed value provided by a remote computing device.

Example 35 includes the subject matter of any of Examples 25-34, and wherein the means for receiving the input seed value comprises means for receiving an input seed value from a data storage of the computing device.

The invention claimed is:

1. A computing device for secure presence assurance, the computing device comprising:
a processor;
a memory coupled to the processor;

a presence assertion circuitry to (i) receive an input seed value, and (ii) perform a first cryptographic hash function to generate a cryptographic hash value based on the input seed value;

a verification module stored in the memory and executed by the processor, wherein the verification module is to (i) perform, based on a virtual model representing the presence assertion circuitry, a second cryptographic hash function to generate a simulated hash value based on the input seed value; (ii) compare the cryptographic hash value to the simulated hash value; (iii) determine, based on the comparison of the cryptographic hash value to the simulated hash value, whether the first cryptographic hash function performed by the presence assertion circuitry is the same as the second cryptographic function performed by the verification module; and (iv) verify integrity of the presence assertion circuitry based on a determination that the first cryptographic hash function performed by the presence assertion circuitry is the same as the second cryptographic function performed by the verification module;

a cryptography module stored in the memory and executed by the processor, wherein the cryptograph module is to cryptographically sign a message that includes the cryptographic hash value; and a communication module stored in the memory and executed by the processor, wherein the communication module is to transmit the cryptographically signed message to a remote computing device for verification of the integrity of the presence assertion circuitry.

2. The computing device of claim 1, wherein to generate the cryptographic hash comprises to:

generate an intermediate cryptographically secure pseudorandom number based on the input seed value; and generate an intermediate cryptographic hash based on the input seed value.

3. The computing device of claim 2, wherein to generate the intermediate cryptographic hash comprises to generate an intermediate cryptographic hash as a function of the intermediate cryptographically secure pseudorandom number.

4. The computing device of claim 1, wherein to generate the cryptographic hash comprises to:

generate a plurality of intermediate cryptographically secure pseudorandom numbers based on the input seed value;

generate a plurality of intermediate cryptographic hashes as a function of the plurality of intermediate cryptographically secure pseudorandom numbers; and generate the cryptographic hash as a function of the intermediate cryptographic hashes.

5. The computing device of claim 1, wherein to determine the simulated hash comprises to:

perform a simulation of the presence assertion circuitry based on the model of the presence assertion circuitry and the input seed value to generate the simulated hash.

6. The computing device of claim 1, wherein the cryptography module is further to encrypt the generated cryptographic hash with a cryptographic key to generate an encrypted cryptographic hash; and wherein the communication module is further to transmit the encrypted cryptographic hash to the remote computing device.

7. The computing device of claim 1, further comprising an input handling module stored in the memory and executed by the processor, wherein the input handling module is to receive the input seed value from user input of a user of the computing device.

8. The computing device of claim 1, herein the communication module is further to receive the input seed value from the remote computing device.

9. The computing device of claim 1, wherein to receive the input seed value comprises to receive an input seed value from a data storage of the computing device.

10. The computing device of claim 1, wherein the verification module is further to deny integrity of the presence assertion circuitry based on a determination that the first cryptographic hash function performed by the presence assertion circuitry is not the same as the second cryptographic hash function performed by the verification module.

11. One or more non-transitory machine-readable storage media comprising a plurality of instructions stored thereon that, in response to execution by a computing device, cause the computing device to:

receive, by a presence assertion circuitry of the computing device, an input seed value;

perform, by the presence assertion circuitry, a first cryptographic hash function to generate a cryptographic hash value based on the input seed value;

perform, based on a virtual model representing the presence assertion circuitry, a second cryptographic hash function to generate a simulated hash value based on the input seed value;

compare the cryptographic hash value to the simulated hash value;

determine, based on the comparison of the cryptographic hash value to the simulated hash value, whether the first cryptographic hash function performed by the presence assertion circuitry is the same as the second cryptographic function;

verify integrity of the presence assertion circuitry based on a determination that the first cryptographic hash function performed by the presence assertion circuitry is the same as the second cryptographic function;

cryptographically sign a message that includes the cryptographic hash value; and transmit the cryptographically signed message to a remote computing device for verification of the integrity of the presence assertion circuitry.

12. The one or more non-transitory machine-readable storage media of claim 11, wherein to generate the cryptographic hash comprises to:

generate an intermediate cryptographically secure pseudorandom number based on the input seed value; and generate an intermediate cryptographic hash based on the input seed value.

13. The one or more non-transitory machine-readable storage media of claim 12, wherein to generate the intermediate cryptographic hash comprises to generate an intermediate cryptographic hash as a function of the intermediate cryptographically secure pseudorandom number.

14. The one or more non-transitory machine-readable storage media of claim 11, wherein to generate the cryptographic hash comprises to:

generate a plurality of intermediate cryptographically secure pseudorandom numbers based on the input seed value;

generate a plurality of intermediate cryptographic hashes as a function of the plurality of intermediate cryptographically secure pseudorandom numbers; and generate the cryptographic hash as a function of the intermediate cryptographic hashes.

15. The one or more non-transitory machine-readable storage media of claim 11, wherein the plurality of instructions stored thereon, in response to the execution by the computing device, further cause the computing device to:
encrypt the generated cryptographic hash with a cryptographic key to generate an encrypted cryptographic hash; and
transmit the encrypted cryptographic hash to the remote computing device.

16. The one or more non-transitory machine-readable storage media of claim 11, wherein to receive the input seed value comprises to receive an input seed value provided by a user of the computing device.

17. The one or more non-transitory machine-readable storage media of claim 11, wherein to receive the input seed value comprises to receive an input seed value provided by the remote computing device.

18. A method for secure presence assurance by a computing device, the method comprising:
receiving, by a presence assertion circuitry of the computing device, an input seed value;
performing, by the presence assertion circuitry, a first cryptographic hash function to generate a cryptographic hash value based on the input seed value;
performing, based on a virtual model representing the presence assertion circuitry, a second cryptographic hash function to generate a simulated hash value based on the input seed value;
comparing, by the computing device, the cryptographic hash value to the simulated hash value;
determining, by the computing device and based on the comparison of the cryptographic hash value to the simulated hash value, whether the first cryptographic hash function performed by the presence assertion circuitry is the same as the second cryptographic function;

verifying, by the computing device, integrity of the presence assertion circuitry based on a determination that the first cryptographic hash function performed by the presence assertion circuitry is the same as the second cryptographic function; and
cryptographically signing, by the computing device, a message that includes the cryptographic hash value; and
transmitting, by the computing device, the cryptographically signed message to a remote computing device for verification of the integrity of the presence assertion circuitry.

19. The method of claim 18, wherein generating the cryptographic hash comprises:
generating an intermediate cryptographically secure pseudorandom number based on the input seed value; and
generating an intermediate cryptographic hash based on the input seed value.

20. The method of claim 18, wherein generating the cryptographic hash comprises:
generating a plurality of intermediate cryptographically secure pseudorandom numbers based on the input seed value;
generating a plurality of intermediate cryptographic hashes as a function of the plurality of intermediate cryptographically secure pseudorandom numbers; and
generating the cryptographic hash as a function of the intermediate cryptographic hashes.

21. The method of claim 18, wherein determining the simulated hash comprises:
performing a simulation of the presence assertion circuitry based on the model of the presence assertion circuitry and the input seed value to generate the simulated hash.

* * * * *